(12) United States Patent
Kim et al.

(10) Patent No.: US 9,905,849 B2
(45) Date of Patent: Feb. 27, 2018

(54) ELECTRODE ASSEMBLY AND LITHIUM SECONDARY BATTERY INCLUDING THE SAME

(71) Applicant: LG Chem, Ltd., Seoul (KR)

(72) Inventors: Daehong Kim, Daejeon (KR); Youn Kyoung Lee, Seoul (KR); Soo Hyun Lim, Daejeon (KR); Tae Jin Park, Daejeon (KR)

(73) Assignee: LG Chem, Ltd. (KR)

( * ) Notice: Subject to any disclaimer, the term of this patent is extended or adjusted under 35 U.S.C. 154(b) by 374 days.

(21) Appl. No.: 14/489,873

(22) Filed: Sep. 18, 2014

(65) Prior Publication Data
US 2015/0004493 A1 Jan. 1, 2015

Related U.S. Application Data

(63) Continuation of application No. PCT/KR2013/003279, filed on Apr. 18, 2013.

(30) Foreign Application Priority Data

Apr. 18, 2012 (KR) .................. 10-2012-0040588

(51) Int. Cl.
| | | |
|---|---|---|
| H01M 4/485 | (2010.01) | |
| H01M 2/16 | (2006.01) | |
| H01M 4/505 | (2010.01) | |
| H01M 10/0525 | (2010.01) | |
| H01M 4/525 | (2010.01) | |
| H01M 4/58 | (2010.01) | |

(52) U.S. Cl.
CPC ........... *H01M 4/485* (2013.01); *H01M 2/162* (2013.01); *H01M 4/505* (2013.01); *H01M 4/525* (2013.01); *H01M 4/5825* (2013.01); *H01M 10/0525* (2013.01); *H01M 2220/20* (2013.01); *Y02E 60/122* (2013.01); *Y02T 10/7011* (2013.01)

(58) Field of Classification Search
CPC ...... H01M 4/485; H01M 4/505; H01M 4/525; H01M 4/5825; H01M 2/162; H01M 10/0525; H01M 2220/20; Y02E 60/122; Y02T 10/7011
See application file for complete search history.

(56) References Cited

U.S. PATENT DOCUMENTS

| | | | |
|---|---|---|---|
| 5,545,468 A | 8/1996 | Koshiba et al. | |
| 8,101,302 B2 | 1/2012 | Lamanna et al. | |
| 2006/0046155 A1 | 3/2006 | Inagaki et al. | |
| 2006/0066341 A1 | 3/2006 | Furukawa et al. | |
| 2006/0068282 A1 | 3/2006 | Kishi et al. | |
| 2009/0081534 A1 | 3/2009 | Takami et al. | |
| 2009/0117470 A1 | 5/2009 | Manev et al. | |
| 2009/0286155 A1 | 11/2009 | Takehara | |
| 2009/0286162 A1 | 11/2009 | Lamanna et al. | |
| 2010/0297505 A1 | 11/2010 | Oki et al. | |
| 2011/0027646 A1 | 2/2011 | Lee et al. | |
| 2013/0078530 A1* | 3/2013 | Kishi ............... | H01M 10/0569 429/338 |

FOREIGN PATENT DOCUMENTS

| | | |
|---|---|---|
| CN | 1095191 A | 11/1994 |
| CN | 1744368 A | 3/2006 |
| CN | 1753233 A | 3/2006 |
| CN | 101399370 A | 4/2009 |
| CN | 101507041 A | 8/2009 |
| CN | 101689629 A | 3/2010 |
| CN | 101785132 A | 7/2010 |
| CN | 101894946 A | 11/2010 |
| CN | 101990721 A | 3/2011 |
| EP | 1487039 A1 | 12/2004 |
| EP | 2061115 A1 | 5/2009 |
| EP | 2811562 A1 | 12/2014 |
| JP | 2006066341 A | 3/2006 |
| JP | 2008140767 A | 6/2008 |
| JP | 2009-081048 A | 4/2009 |
| JP | 2010-009898 * | 1/2010 |
| JP | 2010-009898 A | 1/2010 |
| JP | 2010531041 A | 9/2010 |
| JP | 2011001254 A | 1/2011 |
| KR | 2008-0112977 A | 12/2008 |
| KR | 2009-0042979 A | 5/2009 |
| KR | 2009-0129500 A | 12/2009 |
| KR | 2010-0137447 A | 12/2010 |

OTHER PUBLICATIONS

Zhang "A review on the separators of liquid electrolyte Li-ion batteries". Journal of Power Sources 164 (2007), pp. 351-364.*
Supplementary Search Report from European Application No. 13 77 7580, dated Aug. 31, 2015.
International Search Report from PCT/KR2013/003279 dated Jul. 8, 2013.

* cited by examiner

*Primary Examiner* — Laura Weiner
(74) *Attorney, Agent, or Firm* — Lerner, David, Littenberg, Krumholz & Mentlik, LLP

(57) ABSTRACT

Disclosed are an electrode assembly including a cathode, an anode, and a separator disposed between the cathode and the anode wherein the anode includes lithium titanium oxide (LTO) as an anode active material and the separator is a non-woven separator, and a lithium secondary battery including the same.

10 Claims, 1 Drawing Sheet

[FIG. 1]
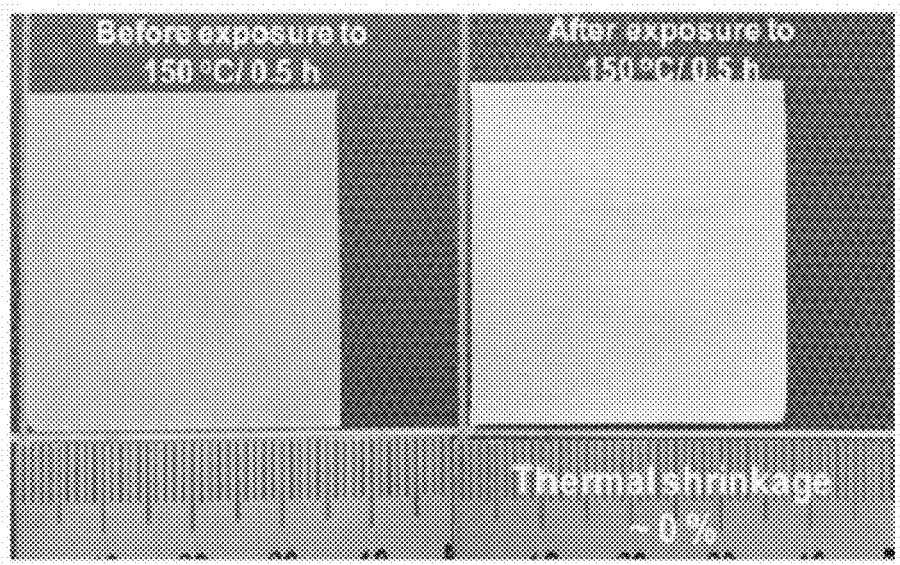
[FIG. 2]
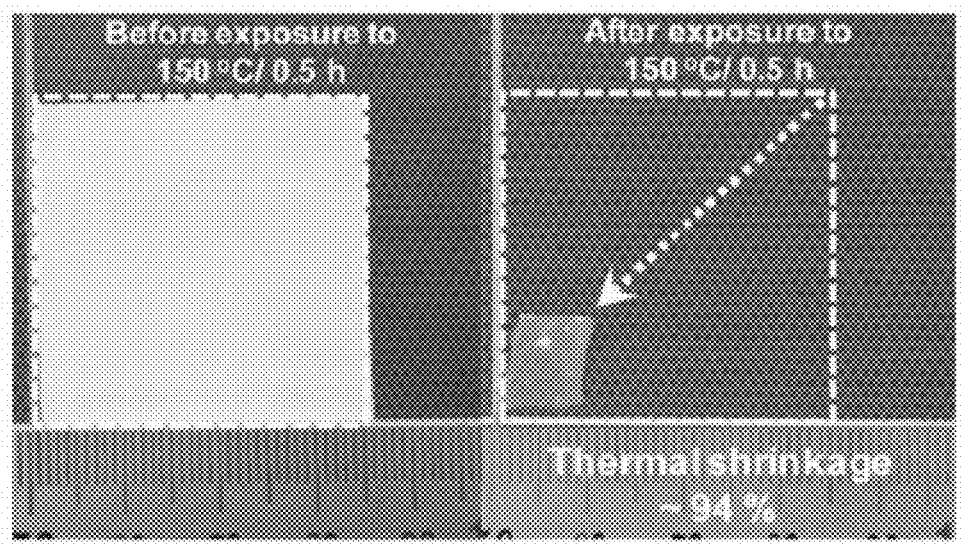

ELECTRODE ASSEMBLY AND LITHIUM SECONDARY BATTERY INCLUDING THE SAME

CROSS-REFERENCE TO RELATED APPLICATIONS

The present application is a continuation of International Application No. PCT/KR2013/003279, filed on Apr. 18, 2013, which claims priority from Korean Patent Application No. 10-2012-0040588, filed on Apr. 18, 2012, in the Korean Intellectual Property Office, the disclosures thereof are incorporated herein by reference.

TECHNICAL FIELD

The present invention relates to an electrode assembly including a cathode, an anode, and the separator disposed between the cathode and the anode wherein the anode includes lithium titanium oxide (LTO) as an anode active material and the separator is a non-woven separator, and a lithium secondary battery including the same.

BACKGROUND ART

As mobile device technology continues to develop and demand therefor continues to increase, demand or secondary batteries as energy sources is rapidly increasing. Among these secondary batteries, lithium secondary batteries, which have high energy density and operating voltage, long cycle lifespan, and low self-discharge rate, are commercially available and widely used.

In addition, as interest in environmental problems is recently increasing, research into electric vehicles (EVs), hybrid EVs (HEVs), and the like, that can replace vehicles using fossil fuels, such as gasoline vehicles, diesel vehicles, and the like, which are one of the main causes of air pollution, is actively underway. As a power source of EVs. HEVs, and the like, a nickel metal-hydride secondary battery is mainly used. However, research into lithium secondary batteries having high energy density, discharge voltage and output stability is actively underway and some lithium secondary batteries are commercially available.

A lithium secondary battery has a structure in which an electrode assembly, in which a porous separator is interposed between a cathode and an anode, each of which includes an active material coated on an electrode current collector, is impregnated with a lithium salt-containing, non-aqueous electrolyte.

Anodes of conventional lithium secondary batteries mainly use, as an anode active material, carbon-based compounds that maintain structural and electrical properties and enable reversible intercalation and deintercalation of lithium ions. However, recently, research into anode materials prepared by alloying Li with silicon (Si) or tin (Sn) and lithium titanium oxides (LTO) instead of conventional carbon-based anode materials has been underway.

Lithium titanium oxides (LTO) are materials that hardly undergo structural changes during charging and discharging and thus exhibit zero strain. In addition, lithium titanium oxides are known to have excellent lifespan characteristics, have a relatively high voltage range, and not to form dendrites, thus exhibiting excellent safety and stability. In addition, lithium titanium oxides (LTO) have electrode characteristics such as quick charging and thus may be charged in several minutes.

However, since lithium titanium oxides (LTO) absorb moisture in the air, when an electrode is manufactured using the lithium titanium oxides (LTO), moisture is scattered and generates a great quantity of gas. The generated gas may cause deterioration of battery performance.

Thus, when lithium titanium oxides as anode active materials are used in lithium secondary batteries, a drying process at a high temperature is required for removal of moisture. However, porous polyolefin based films conventionally used as a separator in lithium secondary batteries shrink at high temperature and as such, cause problems such as an internal short circuit and the like.

Therefore, there is an urgent need to develop technology for a material which is stable at high temperature to remove moisture.

DISCLOSURE

Technical Problem

The present invention aims to address the aforementioned problems of the related art and to achieve technical goals that have long been sought.

As a result of a variety of extensive and intensive studies and experiments, the inventors of the present invention confirmed that, as described below, when a non-woven separator is used in an electrode assembly including a lithium titanium oxide as an anode active material, desired effects may be achieved, thus completing the present invention.

Technical Solution

In accordance with one aspect of the present invention, provided is an electrode assembly including a cathode, an anode, and a separator disposed between the cathode and the anode wherein the anode includes a lithium titanium oxide (LTO) as an anode active material and the separator is a non-woven separator.

The lithium titanium oxide may be represented by Formula 1 below and may be particularly $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$, or the like. However, the composition and type of the lithium titanium oxide are not specifically limited so long as the lithium titanium oxide absorbs/releases lithium ions. More particularly, the lithium titanium oxide may be $Li_{1.33}Ti_{1.67}O_4$ or $LiTi_2O_4$ having a spinel-structure with little change in crystal structure during charge and discharge and excellent reversibility.

$$Li_a Ti_b O_4 \qquad (1)$$

wherein $0.5 \leq a \leq 3$ and $1 \leq b \leq 2.5$.

As described above, when the lithium titanium oxide (LTO) is used as an anode active material, high temperature drying is required to remove moisture. As a result, a non-woven separator having excellent stability at a high temperature is effectively used in the battery of the present invention.

The non-woven separator is interposed between a cathode and an anode. In detail, using, a microfiber having an average thickness of particularly 0.5 to 10 um, more particularly 1 to 7 um, formation of pores having a maximum diameter of 0.1 to 70 um is preferable. Manufacture of non-woven fabric including pores having a maximum diameter of less than 0.1 um is difficult and, when the maximum diameters of pores exceed 70 um, insulation may be deteriorated due to the large size pores. In addition, the thickness of the non-woven separator is preferably 5 to 300 um.

A material of the non-woven separator may be a mixture of one, two or more selected from the group consisting of, particularly, polyethylene, polyolefin such as polypropylene or the like, polyethylene terephthalate, polyester such as polybutylene terephthalate or the like, polyamide such as aramid, polyacetal, polycarbonate, polyimide, polyetherketone, polyethersulfone, polyphenylene oxide, polyphenylene sulfide, polyethylene naphthalene, polytetrafluoroethylene, polyvinylidene fluoride, polyvinyl chloride, polyacrylonitrile, cellulose, nylon, poly(p-phenylene benzobisoxazole), polyarylate, and glass. More particularly, since the non-woven separator is dried at a high temperature of, approximately, 150 to 200□ to remove moisture, the non-woven separator may be made of polytetrafluoroethylene or polyester having a relatively high melting point. As needed, the non-woven separator may be formed using fibers made of two or more materials.

The porosity of the non-woven separator may be particularly 45~90%, more particularly 50~70%. When porosity is below the range, wetting or output characteristics are deteriorated. On the contrary, when porosity is above the range, a separator does not play a role.

The present invention provides a secondary battery, particularly a lithium secondary battery, including the electrode assembly.

The lithium secondary battery is manufactured by impregnating an electrode assembly including a cathode, an anode, and a non-woven separator disposed between the cathode and the anode with a lithium salt-containing electrolyte.

The cathode is manufactured by drying and pressing after coating a mixture of a cathode active material, conductive material and binder on a cathode current collector, and drying and pressing the coated cathode current collector. In this case, as desired, the mixture may further include a filler.

The cathode current collector is generally fabricated to a thickness of 3 to 500 μm. The cathode current collector is not particularly limited so long as it does not cause chemical changes in the fabricated lithium secondary battery and has high conductivity. For example, the cathode current collector may be made of stainless steel, aluminum, nickel, titanium, sintered carbon, aluminum or stainless steel surface-treated with carbon, nickel, titanium, or silver, or the like. The cathode current collector may have fine irregularities at a surface thereof to increase adhesion between the cathode active material and the cathode current collector. In addition, the cathode current collector may be used in any of various firms including films, sheets, foils, nets, porous structures, foams, and non-woven fabrics.

The cathode active material may be, for example, layered compounds metals such as a lithium cobalt oxide (LiCoO$_2$) and lithium nickel oxide (LiNiO$_2$) or compounds substituted with one or more transition metals; lithium manganese oxides such as the formula Li$_{1+x}$Mn$_{2-x}$O$_4$ where x is 0 to 0.33 such as LiMnO$_3$, LiMn$_2$O$_3$ and LiMnO$_2$; lithium copper oxides such as Li$_2$CuO$_2$; vanadium oxides such as LiV$_3$O$_8$, LiV$_3$O$_4$, V$_2$O$_5$ and Cu$_2$V$_2$O$_7$; Ni-site type lithium nickel oxides represented by the formula LiNi$_{1-x}$M$_x$O$_2$ wherein M is Co, Mn, Al, Cu, Fe, Mg, B or Ga and x is 0.01 to 0.3; lithium manganese composite oxides represented by the formula LiMn$_{2-x}$M$_x$O$_2$ where M is Co, Ni, Fe, Cr, Zn or Ta and x is 0.01 to 0.1, or Li$_2$Mn$_3$MO$_8$ where M is Fe, Co, Ni, Cu or Zn; and LiMn$_2$O$_4$ in which some Li is substituted with alkaline emit metal ions; disulfide compounds; and Fe$_2$(MoO$_4$)$^3$, but the present invention is not limited thereto.

In one embodiment, the cathode active material may be a spinel-structure lithium manganese composite oxide, which is a high-voltage oxide, represented by Formula 2 below:

$$\text{Li}_x\text{M}_y\text{Mn}_{2-y}\text{O}_{4-z}\text{A}_z \quad (2)$$

wherein 0.9≤x≤1.2, 0<y<2, and 0≤z<0.2;

M is at least one element selected from the group consisting of Al, Mg, Ni, Co, Fe, Cr, V, Ti, Cu, B, Ca, Zn, Zr, Nb, Mo, Sr, Sb, W, Ti and Bi; and A is at least one monovalent or divalent anion.

In particular, the lithium manganese composite oxide of Formula 2 may be a lithium nickel manganese composite oxide (LNMO) represented by Formula 3 below, more particularly LiNi$_{0.5}$Mn$_{1.5}$O$_4$ or LiNi$_{0.04}$Mn$_{1.6}$O$_4$.

$$\text{Li}_x\text{Ni}_y\text{Mn}_{2-y}\text{O}_4 \quad (3)$$

wherein, 0.95≤x≤1.2, and 0.4≤y≤0.5.

The lithium nickel manganese composite oxide (LNMO) is a spinel-structure composite oxide having a relatively high potential due to high potential of LTO and has a high operating voltage of 4.7 V as compared to an existing cathode having an operating voltage of 3.5 to 4.3 V.

The conductive material is typically added in an amount of 1 to 50 wt % based on a total weight of a mixture including a cathode active material. There is no particular limit as to the conductive material, so long as it does not cause chemical changes in the fabricated battery and has conductivity. Examples of conductive materials include, but are not limited to, graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be typically added in an amount of 1 to 50 wt % based on a total weight of a mixture including a cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymyer (EPDM), sulfonated EPDM, styrene-butadiene rubber, fluorine rubber, and various copolymers.

The filler is optionally used as a component to inhibit cathode expansion. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The anode is manufactured by coating an anode active material on an anode current collector and drying and pressing the coated anode current collector. As described above, a conductive material, a binder, a filler, and the like as described above may be further selectively used.

The anode current collector is generally fabricator to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated carbon, nickel, titanium, silver, or the like, or aluminum-cadmium alloys. Similar to the cathode current collector, the anode current collector may also have fine irregularities at a surface thereof to increase adhesion between the anode active material and the anode current collector. In addition, the anode current collector may be used in any of various forms including films, sheets, foils, nets, porous structures, foams, and non-woven fabrics.

Examples of the anode active material include, in addition to a lithium titanium oxide (LTO), for example, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, F, Si, Group I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; and titanium oxides.

The electrolyte containing a lithium salt consists of an electrolyte and a lithium salt. The electrolyte may be a non-aqueous organic solvent, an organic solid electrolyte, an inorganic solid electrolyte, or the like, but embodiments of the present invention are not limited thereto.

For example, the non-aqueous organic solvent may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran dimethylsulfoxide, 1,3-dioxolane, formamide, dimethylformamide, dioxolane, acetonitrile, nitromethane, methyl formate, methyl acetate, phosphoric acid triester; trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine cyclic ether, ethylenediamine, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoroethylene carbonate (FEC), propene sultone (PRS), or the like.

In a specific embodiment, a lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent of a cyclic carbonate such as EC or PC, which is a high dielectric solvent, and a linear carbonate such as DEC, DMC, or EMC, which is a low-viscosity solvent.

In addition, the present invention also provides a battery module including the secondary battery as a unit battery and a battery pack including the battery module.

The battery pack may be used as a power source of devices that require high temperature stability, long cycle characteristics, high rate characteristics, and the like.

Examples of the devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF THE DRAWINGS

The above and other objects, features and other advantages of the present invention will be more clearly understood from the following detailed description taken in conjunction with the accompanying drawing, in which:

FIG. 1 is an image illustrating shrinkage of a non-woven separator of Example 1 according to Experimental Example 1 by high temperature drying; and FIG. 2 is an image illustrating shrinkage of a separator of Comparative Example 1 according to Experimental Example 1 by high temperature drying.

MODE FOR INVENTION

Now the present invention will be described in more detail with reference to the following examples. These examples are provided only for illustration of the present invention and should not be construed as limiting the scope and spirit of the present invention.

Example 1

$Li_{1.33}Ti_{1.67}O_4$ as an anode active material, Denka black as conductive material and PVdF as a binder were added in a weight ratio 88:8.5:3.5 to NMP and mixed therewith to prepare an anode mixture. Subsequently, the anode mixture was coated to a thickness of 200 μm onto 20 μm Al foil and the coated Al foil was pressed and dried, thereby completing fabrication of an anode.

In addition, $LiNi_{0.5}Mn_{1.5}O_4$ as a cathode active material. Denka black as conductive material and PVdF as a binder were added in a weight ratio 83:7:1.0 to NMP and mixed therewith to prepare a cathode mixture. Subsequently, the cathode mixture was coated onto 20 μm Al foil and the coated Al foil was pressed and dried, thereby completing fabrication of a cathode An electrode assembly was manufactured by interposing PET non-woven having a thickness of 20 μm as a separator between the prepared cathode and anode. After accommodating the electrode assembly in an aluminum can or an aluminum pouch, electrode leads were connected thereto.

Subsequently, a carbonate based composite solution including 1M LiPF6 as an electrolyte was injected thereinto. The resulting battery case was sealed, thereby completing fabrication of a lithium secondary battery Comparative Example 1

A lithium secondary battery was manufactured in the same manner as in Example 1, except that a porous separator made of polyethylene was used.

Experimental Example 1

After maintaining the separator used in Example 1 and Comparative Example 1 at 150□ for 30 minutes, shrinkage degrees (%) of the separator areas were measured. Results are illustrated in FIG. 1.

As illustrated in FIG. 1, the separator of Example 1 shrank very little. On the other hand, the separator of Comparative Example 1 showed a shrinkage ratio of 94%. Namely, the separator of Example 1 has superior thermal stability.

Experimental Example 2

Moisture Measurement

The secondary batteries of Example 1 and Comparative Example 1 were dried at a temperature at which used separators are not shrunk, namely, 200□ and 55□ respectively. Subsequently, moisture contents inside, the secondary batteries were measured. Results are summarized in Table 1 below.

TABLE 1

|  | Drying temperatures (□) | Moisture contents (ppm) |
| --- | --- | --- |
| Example 1 | 200 | 80 |
| Comparative Example 1 | 55 | 127 |

Referring to Table 1, the secondary battery according to Example 1 used a non-woven separator and thereby could be dried at 200□, and, accordingly, showed a low moisture content of 80 ppm. On the other hand, the secondary battery according to Comparative Example 1 was dried at 55□ to prevent shrinkage of the porous separator and thereby it was difficult to remove moisture and, accordingly, a high moisture content was observed.

Experimental Example 3

The capacities of the secondary batteries according to Example 1 and Comparative Example 1 were measured by charging and discharging at a voltage of 2 to 3.35 V and 1 C. Subsequently, the batteries were stored in 100% SOC at 45□ for 4 weeks and then capacities of the batteries were measured again.

In addition, the cycle characteristics of the secondary batteries according to Example 1 and Comparative Example 1 were measured by charging and discharging at a voltage of 2 to 3.35 V and 1 C in a chamber of 25□.

As a result, the capacity of the secondary battery according to Example 1 was, approximately, 17% higher than that of the secondary battery according to Comparative Example 1. After storing at a high temperature, the capacity of the secondary battery according to Example 1 was, approximately, 8% higher than that of the secondary battery according to Comparative Example 1. After 100 charging and discharging cycles, the capacity retention ratio of the secondary battery according to Example 1 was, approximately, 12% higher than that of the secondary battery according to Comparative Example 1. Accordingly, the secondary battery according to Example 1 exhibits superior capacity, high temperature stability and cycle characteristics.

Namely, the battery of Example 1 may be dried at a high temperature and thereby moisture inside an LTO anode active material may be effectively removed and, accordingly gas generation is reduced, resulting in improvement of overall battery performances such as capacity, stability at high temperature and cycle characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, an electrode assembly and a secondary battery using a non-woven separator according to the present invention are cheap, when compared to existing separators, and exhibit superior output characteristics and excellent stability at high temperature, due to high porosity, and, accordingly, when internal short circuit due to shrinkage during, high temperature drying for removal of remove moisture caused by lithium titanium oxide may be prevented.

The invention claimed is:

1. An electrode assembly comprising a cathode, an anode, and a separator disposed between the cathode and the anode wherein the anode comprises lithium titanium oxide (LTO) as an anode active material and the separator is a non-woven separator having a porosity of 45 to 90%,
wherein the non-woven separator is made of polyester and the lithium titanium oxide is $Li_{1.33}Ti_{1.67}O_4$ or $LiTi_2O_4$,
wherein the cathode is a high-voltage cathode comprising a spinel-structure lithium nickel manganese composite oxide (LNMO) represented by Formula 3 below as a cathode active material:

$$Li_xNi_yMn_{2-y}O_4 \qquad (3)$$

wherein 0.9≤x≤1.2, and 0.4≤y≤0.5.

2. The electrode assembly according to claim 1, wherein the lithium nickel manganese composite oxide of Formula 3 is $LiNi_{0.5}Mn_{1.5}O_4$ or $LiNi_{0.4}Mn_{1.6}O_4$.

3. The electrode assembly according to claim 1, wherein the non-woven separator has a porosity of 50 to 70%.

4. The electrode assembly according to claim 1, wherein the polyester is polybutyleneterephthalate.

5. A secondary battery comprising an electrode assembly according to claim 1.

6. The secondary battery according to claim 5, wherein the secondary battery is a lithium secondary battery.

7. A battery module comprising the secondary battery according to claim 6 as a unit battery.

8. A battery pack comprising the battery module according to claim 7.

9. A device comprising the battery pack according to claim 8.

10. The device according to claim 9, wherein the device is an electric vehicle, a hybrid electric vehicle, a plug-in hybrid electric vehicle, or a system for storing power.

* * * * *